Sept. 7, 1926.
R. A. PARKER
1,598,742
AUTOMOBILE RINSER
Filed August 5, 1925
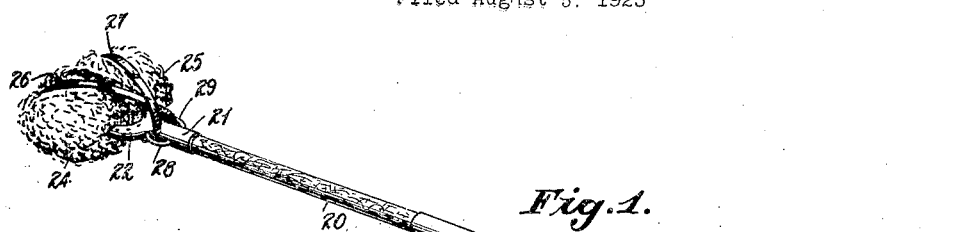
Fig. 1.
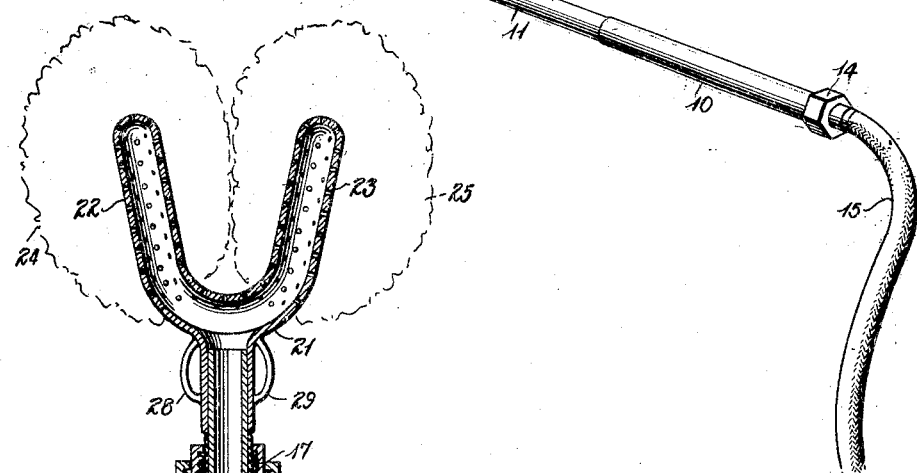
Fig. 2.
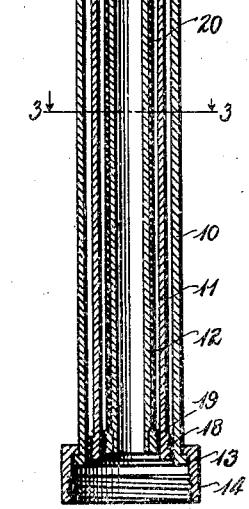
Fig. 3.
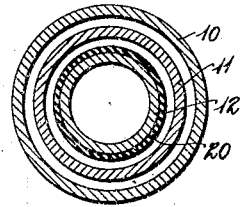
Inventor
R.A. Parker
By Brown & Phelps
Attorneys Patented Sept. 7, 1926.

1,598,742

UNITED STATES PATENT OFFICE.

RUFUS A. PARKER, OF ATLANTA, GEORGIA.

AUTOMOBILE RINSER.

Application filed August 5, 1925. Serial No. 48,257.

The invention relates to devices for cleansing, with special reference to the washing of automobiles.

An object of the invention is the provision of a device of the class referred to, carrying movable sponges or other swab elements with means for delivering water to the interior thereof.

A further object of the invention is the provision of a device of this nature having two swab elements which may be passed one upon each side of a portion of an automobile such as a spoke of the wheel.

A further object of the invention is the provision of a device wherein the swabs may be readily removed or replaced.

A further object of the invention is the provision of such a device having a rigid handle which may be readily extended so as to reach otherwise inaccessible portions of a machine or structure.

Further objects of the invention will appear from the following description when read in connection with the accompanying drawing wherein, Fig. 1 is a perspective view of a form of the device fully extended and having a hose attached thereto.

Fig. 2 is a central longitudinal section of the device, and

Fig. 3 is a transverse section on line 3—3 of Fig. 2 upon an enlarged scale.

As shown the device comprises a plurality of tubular handle elements, 3 being shown at 10, 11 and 12. The element 10 is shown as provided with a flange 13 coacting with a union 14 for the purpose of attachment to a hose as 15. The members 10 and 11 are each shown as provided with internal screw threads 16 and 17 respectively for coaction with external screw threads 18 and 19 carried by the ends of the members 11, 12. By the provision of this structure the device may be used in the collapsed position shown in Fig. 2 or with one or both the members 11, 12 extended.

To avoid scratching polished surfaces in the use of the device, the tube 12 is desirably covered with a soft material as chamois skin or rubber and as indicated at 20.

Mounted upon the extremity of the tube 12 there is shown a head 21 which is preferably rigidly attached thereto and which head comprises two branches 22, 23 having their walls provided with perforations for the escape of water. To serve as swabs for removal of dirt in the presence of the thus provided water the branches 22, 23 of the head are covered with swab elements 24, 25 desirably formed of separate sponges.

The sponges are shown as retained in position upon the head by means of straps 26, 27 passed through loops 28, 29 respectively, which loops are formed upon the head 21 adjacent the branching of the portions 22, 23 therefrom. The operation of the device will be obvious from the above description from which it will be seen that the swabs can be passed one upon each side of a spoke effectually washing each side of the same or the entire head may be used as a single cleaning element which in combination with the water flowing therefrom will remove dirt and grit from a polished surface with minimum damage thereto.

Minor changes may be made in the physical embodiment of the invention without departing from its spirit.

I claim:—

A cleaning device comprising, in combination, a tubular handle, a hollow bifurcated head mounted upon said handle having perforations in its surface, a porous swab mounted upon each of the furcations of the said head, means for removably securing said swabs in place comprising strap-receiving loops formed on the head, and a strap extending around each of said swabs and through one of said loops, and means to attach water-conducting means to said handle.

RUFUS A. PARKER.